T. J. COFFEY.
AUTOMOBILE SIGNALING DEVICE.
APPLICATION FILED MAY 10, 1918.

1,308,662.

Patented July 1, 1919.

INVENTOR.
Timothy Joseph Coffey
By Chas. H. Luther
ATTORNEY.

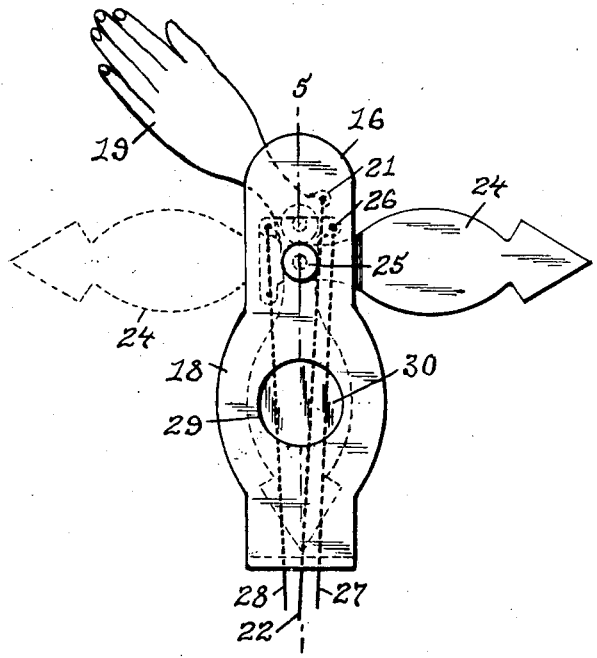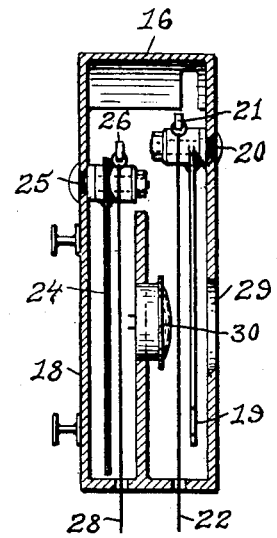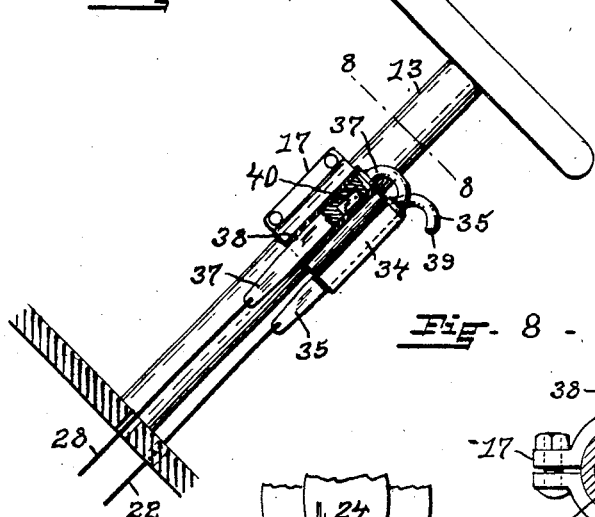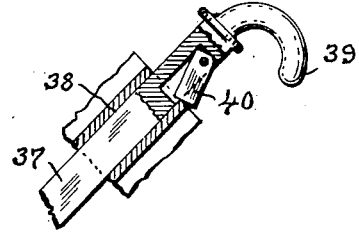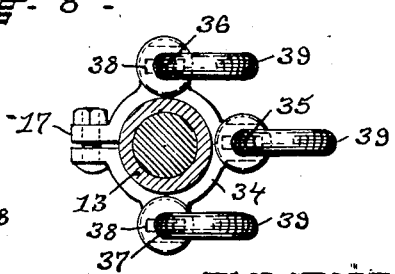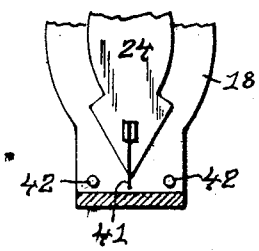

a
UNITED STATES PATENT OFFICE.

TIMOTHY JOSEPH COFFEY, OF EAST PROVIDENCE, RHODE ISLAND.

AUTOMOBILE SIGNALING DEVICE.

1,308,662.  Specification of Letters Patent.  Patented July 1, 1919.

Application filed May 10, 1918. Serial No. 233,714.

*To all whom it may concern:*

Be it known that I, TIMOTHY JOSEPH COFFEY, a citizen of the United States, residing at East Providence, in the county of Providence and State of Rhode Island, have invented a new and useful Improvement in Automobile Signaling Devices, of which the following is a specification.

In the use of automobiles having no signaling device, it is a common, crude and awkward practice for the driver to hold out his arm to indicate that he intends to stop and to point with his hand to the right or left to show in which direction he intends to go, when approaching a main or cross street.

The object of my invention is to provide an automobile with a signaling device having a stop and direction indicator at the rear and a direction indicator at the front, all operated from the steering column by the driver, at a minimum effort and loss of time.

Further objects of my invention are to simplify the construction and operation, and reduce the cost of manufacturing such a signaling device for automobiles.

My invention consists in the peculiar and novel construction of a signaling device for automobiles, said signaling device having a direction indicator at the front and a stop and direction indicator at the back of the car, both indicators being operated from the steering column, said signaling device having details of construction, as will be more fully set forth hereinafter and claimed.

Fig. 4 is a face view of the rear indicator showing the hand in its raised position indicating that the car is going to stop, the arrow in its raised position indicating that the car is going to the right, and with the arrow in broken lines, indicating that the arrow also indicates when the car is to go to the left.

Fig. 5 is a vertical sectional view taken on line 5.5 of Fig. 4 of the rear indicator, with the signal hand and arrow in their normal downward position, in the frame of the indicator.

Fig. 6 is a side view of a steering column showing the indicator operating latches on the steering column and one of the latches partly in section.

Fig. 7 is an enlarged detail view partly in section showing the upper portion of one of the latches in its raised or signaling position.

Figure 1:
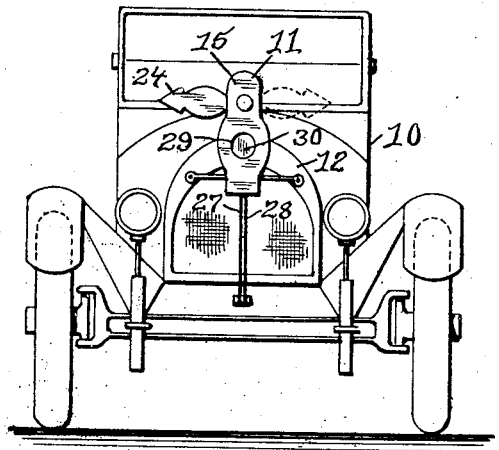
Figures 1 and 2 are front and rear views of an automobile provided with my improved automobile signaling device.
Figure 2:
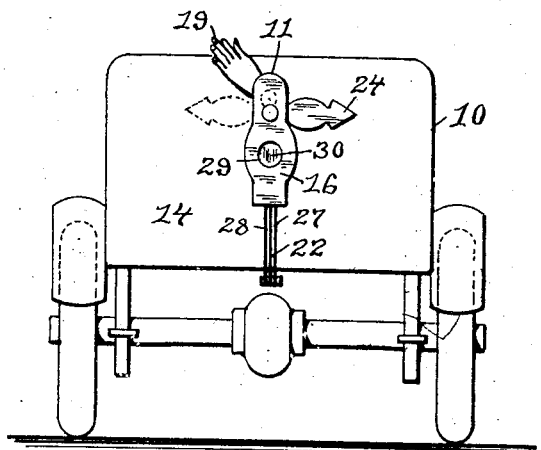

Fig. 8 is an enlarged transverse sectional view taken on line 8.8 of Fig. 6, looking down on the three indicator operating latches in the indicator operating mechanism on the steering column, and Fig. 9 is an enlarged detail sectional view of the lower portion of an indicator, showing a modified means of holding the indicating arrows in their downward normal positions against lateral movement of the arrows.

In the drawings 10 indicates an automobile and 11 my mechanically operated automobile signaling device, the automobile having the usual radiator frame 12 on the front, steering column 13 and rear body end 14.

Figure 3:
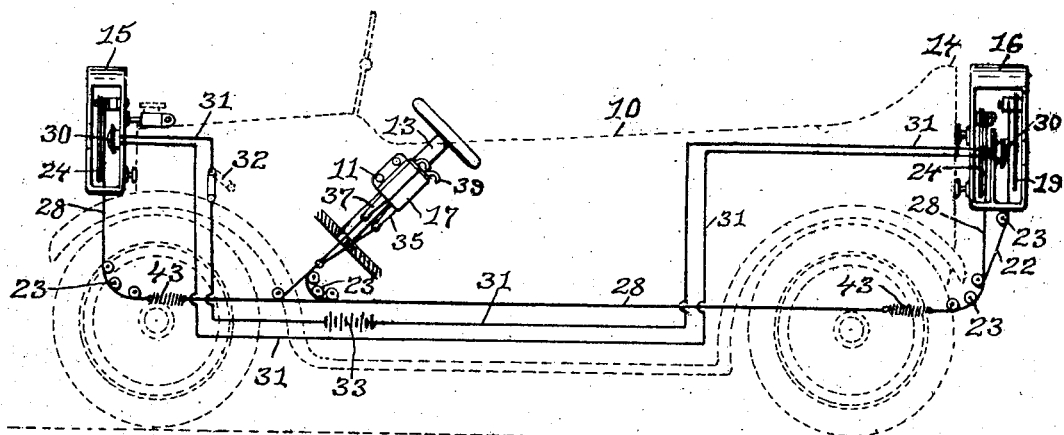
Fig. 3 is a diagrammatic side view illustrating the lay-out of the signaling device in full lines and indicating the side view of the automobile in broken lines.

My improved automobile signaling device 11 consists principally of a front direction indicator 15 secured to the radiator frame 12, a rear stop and direction indicator 16 secured to the rear body end 14 of the car and an indicator operating mechanism 17 on the steering column 13, the stop signal and the direction signals in both front and rear indicators being operatively connected to latches in the indicator operating mechanism 17 on the steering column 13 by wires, as indicated in Fig. 3.

The rear stop and direction indicator 16 consists of a frame 18 closed on the front, back, top and bottom and open on the sides and secured at the back to the rear body end 14 of the car. A stop signal 19 in the form of a hand is pivotally secured at its wrist end to a stud 20 on the inside of the front of the frame 18, and the wrist end carries a short side lever 21. A wire 22 is connected at one end to the end of the lever 21. This wire 22 extends down through a hole in the bottom of the frame 18, around pulleys 23.23, under the car, then around pulleys 23.23 and up to the indicating operating mechanism 17 where the end of the wire is attached to the lower end of a central latch 35 in the indicator operating mechanism 17, as indicated in Fig. 3. A direction signal 24 in the form of an arrow is pivotally secured at its inner end to a stud 25 on the back of the frame and has a cross-arm 26. A wire 27 is connected at one end to the right hand end of the cross-arm. This wire 27 extends down through a hole in the bottom of the casing, around pulleys 23.23, under the car, to a coil spring 43 and then around pulleys 23.23 and up to the indicator operating mechanism 17 where the end of the wire is attached to the lower end of a left hand latch 36 in the operating mechanism 17. A wire 28 is connected at one end to the left hand end of the cross-arm 26. This wire 28 extends down through a hole in the bottom of the casing, around pulleys 23.23, under the car, then around pulleys 23.23 and up to the indicator operating mechanism 17 where the end of the wire is attached to the lower end of a right hand latch 37 in the operating mechanism 17.

The front direction indicator 15 is secured to the radiator frame 12 and is exactly the same as the rear indicator 16, except that the stop signal 19 is omitted. The wires from the direction signal 24 in the front indicator 15 are connected right and left to the right and left latches in the indicator operating mechanism 17 as described for the rear indicator 16, and the operation of a right or left latch will indicate both front and rear that the car is going to the right or left.

Each indicator frame 18 has an opening 29 in the front and secured back of each opening to the frame 18 is an electric lamp 30 having preferably a green light and connected by the usual wires 31.31, and switch 32 to a battery 33, as indicated in Fig. 3. With the stop and direction signals down in the frame in front of the lamps, the light is cut off from the openings 29.29. When the signals are raised the green light shines through the openings 29.29, and signals both front and rear that the car is either to stop or go in another direction. The signal lights may be arranged so as to reflect on the signals when the signals are raised.

The indicator operating mechanism 17 consists of a latch frame 34 clamped to the steering column 13 and having a central latch 35, a right hand latch 36 and a left hand latch 37, each slidably supported in guideways 38.38 in the latch frame 34, as shown in Fig. 6. Each latch has a hook-shaped upper finger end 39 and a pawl 40 pivotally secured at its upper end in the underside of the stem of the latch in a position to drop out by gravity and catch on the upper end of the frame 34 and hold the latch in its raised position, as shown in Fig. 7.

In the modified form as shown in Fig. 9 a whip spring 41 is secured to the ends of the signals and pins 42.42 are secured to the frame, the whip spring being between the pins, holds the signals against undue lateral movement when down.

In the operation of my improved automobile signaling device the stop signal 19 at the rear is operated by pulling up the central latch 35, the direction signals 24.24 at the front and rear are operated by pulling up either the right or left latches 36 or 37 to indicate that the car is going either to the right or left, the give of the coil springs 43.43 allows the one direction signal to be raised to either the right or left and the signals are released and drop down into their frames by gravity, by pushing in the pawls 40.40 in the latches, thereby allowing the latches to drop down by gravity in the latch frame 34.

It is evident that my improved signaling device could be applied to any kind of a road vehicle, the signaling wires could be inclosed in pipes and other details of construction could be varied without departing from the scope of the appended claims.

Having thus described my invention I claim as new:—

1. In an automobile, a signaling device comprising an indicator frame open on the sides and having an intermediate partition supporting a lamp, a stop signal in the form of a hand pivotally secured to a stud in the frame, a direction signal in the form of an arrow pivotally secured to a stud in the frame and having a T shaped cross-arm on its pivot end, a wire operatively connected to the stop signal, a wire having an intermediate coil spring connection operatively connected to one end of the cross arm on the direction signal, a wire having an intermediate coil spring connection operatively connected to the other end of the cross arm on the direction signal, means for operating the wires, a stop signal lamp in the indicator frame, said indicator frame having an opening in front of the lamp, whereby when the stop signal is down it closes the opening in front of the lamp and when the stop signal is raised the light from the lamp shows through the opening in the frame, thereby giving a light stop signal at night.

2. The combination with an automobile having a steering column 13 of an automobile signaling device comprising a stop and direction indicator frame 18, a stop signal 19 in the form of a hand pivotally secured to a stud 20 in the frame 18, a direction signal 24 in the form of an arrow pivotally secured to a stud 25 in the frame 18 and having a cross-arm 26, a wire 22 operatively connected to the inner end of the stop signal 19, a wire 27 operatively connected to one end of the cross-arm 26 on the direction signal 24 and having an intermediate coil spring 43, a wire 28 operatively connected to the other end of the arm 26 and having an intermediate coil spring 43, means for operating the wires, said indicator frame 18 having an opening 29 in the front and a lamp back of the opening, as described.

In testimony whereof I have signed my name to this specification.

TIMOTHY JOSEPH COFFEY.